(12) United States Patent
Yamane et al.

(10) Patent No.: US 8,542,456 B2
(45) Date of Patent: Sep. 24, 2013

(54) MAGNETIC HEAD HAVING A CONTACT SENSOR

(75) Inventors: Takekazu Yamane, Tokyo (JP); Yosuke Antoku, Tokyo (JP); Katsuki Kurihara, Tokyo (JP); Norio Takahashi, Tokyo (JP); Kenzo Makino, Tokyo (JP)

(73) Assignee: TDK Corporation, Tokyo (JP)

( * ) Notice: Subject to any disclaimer, the term of this patent is extended or adjusted under 35 U.S.C. 154(b) by 267 days.

(21) Appl. No.: 13/218,150

(22) Filed: Aug. 25, 2011

(65) Prior Publication Data

US 2013/0050867 A1 Feb. 28, 2013

(51) Int. Cl.
*G11B 5/127* (2006.01)
*G11B 21/02* (2006.01)
*G11B 5/48* (2006.01)
*G11B 5/02* (2006.01)

(52) U.S. Cl.
USPC ........... 360/59; 360/125.03; 360/75; 360/244

(58) Field of Classification Search
None
See application file for complete search history.

(56) References Cited

U.S. PATENT DOCUMENTS

| 6,381,094 | B1 * | 4/2002 | Gill ............................. 360/125.3 |
| 6,473,277 | B1 * | 10/2002 | Gill ............................... 360/319 |
| 6,985,339 | B2 * | 1/2006 | Seigler et al. ............ 360/324.12 |
| 7,589,928 | B2 | 9/2009 | Roy et al. |
| 2002/0191349 | A1 * | 12/2002 | Hsu et al. ...................... 360/317 |
| 2003/0043490 | A1 * | 3/2003 | Clinton et al. .................. 360/55 |
| 2005/0286178 | A1 * | 12/2005 | Gill et al. .................... 360/324.2 |
| 2008/0037171 | A1 * | 2/2008 | Mukherjee et al. ........... 360/131 |
| 2010/0296203 | A1 * | 11/2010 | Kawakami et al. ...... 360/324.11 |
| 2013/0050867 | A1 * | 2/2013 | Yamane et al. ................. 360/59 |

FOREIGN PATENT DOCUMENTS

| JP | A 08-167121 | 6/1996 |
| JP | B2 2953417 | 9/1999 |
| JP | B2 2980074 | 11/1999 |
| JP | A 2004-164797 | 6/2004 |
| JP | A 2008-077751 | 4/2008 |

OTHER PUBLICATIONS

U.S. Appl. No. 12/756,640, filed Apr. 8, 2010.

* cited by examiner

*Primary Examiner* — Peter Vincent Agustin
(74) *Attorney, Agent, or Firm* — Oliff & Berridge, PLC

(57) ABSTRACT

A magnetic head includes a medium facing surface that faces a surface of a recording medium, a write head section, a contact sensor that detects contact of the medium facing surface with the surface of the recording medium, and a heat sink adjacent to the contact sensor. The write head section has a magnetic pole that produces a write magnetic field for writing data on the recording medium. The contact sensor and the heat sink have respective end faces located in the medium facing surface. The contact sensor varies in resistance in response to temperature variations, and is to be energized. The heat sink includes an intermediate layer made of a non-magnetic metal material, and two ferromagnetic layers made of a metal-based magnetic material, the two ferromagnetic layers being disposed with the intermediate layer therebetween, and being antiferromagnetically exchange-coupled to each other via the intermediate layer.

6 Claims, 11 Drawing Sheets

MAGNETIC HEAD HAVING A CONTACT SENSOR

BACKGROUND OF THE INVENTION

1. Field of the Invention

The present invention relates to a magnetic head that is used for writing data on a recording medium, and more specifically, to a magnetic head having a contact sensor.

2. Description of the Related Art

Recently, magnetic recording devices such as magnetic disk drives have been improved in recording density, and magnetic heads of improved performance have been demanded accordingly. Among the magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the magnetic head is mounted on a slider that flies slightly above the surface of a recording medium. The magnetic head has a medium facing surface that faces the surface of the recording medium.

For a magnetic disk drive, it is desired that the distance between the medium facing surface of the magnetic head and the surface of the recording medium be small and constant in order to prevent the reading and writing capabilities from degrading with increasing recording density.

If the distance between the medium facing surface of the magnetic head and the surface of the recording medium is reduced, however, the medium facing surface becomes more likely to come into contact with the surface of the recording medium. On the other hand, the surface of the recording medium sometimes has minute projections. In such a case, the medium facing surface can come into contact with the projections of the surface of the recording medium, though not with the other areas of the surface. Furthermore, if the surface of the recording medium is wavy, the medium facing surface can come into contact with certain areas of the surface of the recording medium. Since the contact of the medium facing surface with the surface of the recording medium hinders normal read and write operations, it is necessary to avoid such a contact.

To cope with this, the following two methods may be employed to prevent or detect the contact of the medium facing surface of the magnetic head with the surface of the recording medium by using a contact sensor for detecting the contact of the medium facing surface with the surface of the recording medium. A first method is to carry out a test prior to shipment of the magnetic disk drive as a product in order to detect the portion of the surface of the recording medium with which the medium facing surface may come into contact. This makes it possible to control the magnetic disk drive so that the medium facing surface will not come into contact with the surface of the recording medium during the read/write operations of the magnetic head. A second method is to monitor the distance between the medium facing surface and the surface of the recording medium, with the contact sensor allowed to operate all the time during the read/write operations of the magnetic head. The first and second methods may be used in combination.

JP-A-2008-77751 discloses a head slider for inspecting a magnetic disk. The head slider includes: a substrate having a flying surface and an element-forming surface; a heat generating resistor section formed on the element-forming surface of the substrate; and a thermal conductive layer disposed above or below the heat generating resistor section. The heat generating resistor section includes a heat generating resistor layer formed of a material having a predetermined temperature coefficient of resistance, such as metal, and two lead layers for passing an electric current through the heat generating resistor layer. The heat generating resistor layer generates heat when supplied with power via the two lead layers, and thereby causes part of an end face of the slider on the flying surface side to protrude. The protruded part of the end face of the slider may come into contact with or collide with a projection on the magnetic disk surface. In this case, the frictional heat produced by this event increases the temperature of the heat generating resistor layer, thereby changing the resistance of the heat generating resistor layer. This allows for detecting the contact or collision of the protruded part of the end face of the slider with the projection on the magnetic disk surface. The thermal conductive layer is formed of a material having a high thermal conductivity, such as metal. The thermal conductive layer allows the heat from the heat generating resistor layer to be uniformly distributed in the region where the thermal conductive layer is present and a region therearound.

U.S. Pat. No. 7,589,928 discloses a magnetic head that includes a sensor capable of measuring the distance between the magnetic head and the surface of a recording medium on the basis of resistance variations. The sensor is energized, and any resistance variation of the sensor appears as a variation in voltage drop in the sensor. A sudden increase in voltage drop in the sensor allows for detecting that the magnetic head has come into contact with the recording medium.

Now, a case will be contemplated where a magnetic head is provided with a contact sensor that varies in resistance in response to temperature variations. In this contact sensor, a variation in resistance is detected, for example, as a variation in voltage drop. For such a contact sensor, in general, increasing the voltage applied to the contact sensor can improve the performance, such as sensitivity and signal-to-noise ratio, of the contact sensor. On the other hand, however, increasing the voltage applied to the contact sensor increases the current density of the contact sensor and also increases the amount of heat generated by the contact sensor itself. This causes electromigration to become noticeable and results in a reduction in service life of the contact sensor, thus leading to degradation in reliability of the contact sensor.

To address this problem, the inventors of this application contemplated providing a heat sink to be adjacent to the contact sensor. Each of the contact sensor and the heat sink has an end face located in the medium facing surface. The inventors confirmed by simulations that the heat sink thus provided could improve the reliability of the contact sensor when the voltage applied to the contact sensor was increased.

The inventors then discussed the material for the heat sink. A heat sink for typical use may be formed of a material having a high thermal conductivity. For a heat sink that is to be provided adjacent to the contact sensor in a magnetic head, however, some materials may give rise to the following problem due to the method of manufacturing the magnetic head.

Typically, magnetic heads are manufactured by the following method. First, components of a plurality of magnetic heads are formed on a substrate to fabricate a substructure that includes a plurality rows of pre-slider portions. The pre-slider portions are to become a plurality of sliders later. The substructure is then cut to separate the pre-slider portions from each other into a plurality of sliders. When forming the plurality of sliders, the cut surface is polished into the medium facing surface.

In the step of forming the medium facing surface by polishing, the amount of polishing may differ among components of the magnetic head due to differences in materials of the components. Accordingly, the amount of polishing of the heat sink in the step of forming the medium facing surface may become greater or smaller, depending on the material of the heat sink, than the amounts of polishing of the components of the write head section and the read head section. As a result, in the medium facing surface, the end face of the heat sink may be recessed or protruded relative to the end face of each of the write head section and the read head section. Accordingly, the amount of polishing of the contact sensor adjacent to the heat sink may be affected by the amount of polishing of the heat sink, so that the end face of the contact sensor in the medium facing surface may also be recessed or protruded relative to the end face of each of the write head section and the read head section. In such a case, the sensitivity of the contact sensor may be reduced, or the write characteristics of the write head section and the read characteristics of the read head section may deteriorate. More specifically, if the end face of each of the heat sink and the contact sensor is recessed relative to the end face of each of the write head section and the read head section, the sensitivity of the contact sensor will be degraded. On the other hand, if the end face of each of the heat sink and the contact sensor is protruded relative to the end face of each of the write head section and the read head section, the distance between the surface of the recording medium and the end face of each of the write head section and the read head section in the medium facing surface is not sufficiently small at the point in time at which the contact sensor has detected a contact. Consequently, in this case, the write characteristics of the write head section and the read characteristics of the read head section may deteriorate.

To address this problem, the inventors of this application contemplated forming the heat sink from a metal-based magnetic material as with the magnetic pole, a principal element of the write head section. This allows the amount of polishing of the heat sink in the step of forming the medium facing surface to be at the same level as that of the magnetic pole, thereby making it possible to avoid the aforementioned problem.

A heat sink formed of a metal-based magnetic material, however, may cause a magnetic field to occur from the end face of the heat sink located in the medium facing surface in a direction toward the recording medium. The magnetic field may adversely affect the recording medium or the write characteristics of the write head section.

OBJECT AND SUMMARY OF THE INVENTION

It is an object of the present invention to provide a magnetic head including a write head section and a contact sensor, the contact sensor varying in resistance in response to temperature variations, the magnetic head being configured to provide improved reliability of the contact sensor without degrading the sensitivity of the contact sensor and without adversely affecting the recording medium and the write characteristics of the write head section, and to provide a head assembly and a magnetic recording device that each include such a magnetic head.

A magnetic head of the present invention includes: a medium facing surface that faces a surface of a recording medium; a write head section; a contact sensor that detects contact of the medium facing surface with the surface of the recording medium; and a heat sink adjacent to the contact sensor. The write head section has a magnetic pole that produces a write magnetic field for writing data on the recording medium. The contact sensor and the heat sink have respective end faces located in the medium facing surface. The contact sensor varies in resistance in response to temperature variations, and is to be energized. The heat sink includes an intermediate layer made of a nonmagnetic metal material, and two ferromagnetic layers made of a metal-based magnetic material. The two ferromagnetic layers are disposed with the intermediate layer therebetween, and are antiferromagnetically exchange-coupled to each other via the intermediate layer.

The magnetic head of the present invention allows the heat sink to dissipate heat that the contact sensor generates when energized. According to the present invention, the heat sink includes the intermediate layer, and the two ferromagnetic layers that are antiferromagnetically exchange-coupled to each other via the intermediate layer. Accordingly, when compared with a heat sink that consists only of a ferromagnetic layer, the heat sink of the invention is capable of reducing the magnitude of the magnetic field directed toward the recording medium from the end face of the heat sink.

The magnetic head of the present invention may further include an insulating film interposed between the contact sensor and the heat sink. The insulating film may have a thickness greater than zero and smaller than 370 nm.

The magnetic head of the present invention may further include a heater that generates heat for causing part of the medium facing surface to protrude.

A head assembly of the present invention includes a slider, and a supporter that flexibly supports the slider. The slider includes the magnetic head of the present invention and is disposed to face the surface of the recording medium.

A magnetic recording device of the present invention includes the magnetic head of the present invention, the recording medium, and a positioning device that supports the magnetic head and positions the magnetic head with respect to the recording medium.

The magnetic head of the present invention allows the heat sink to dissipate heat that the contact sensor generates when energized, as described above. This makes it possible to improve the reliability of the contact sensor.

In the present invention, the heat sink includes two ferromagnetic layers made of a metal-based magnetic material. The two ferromagnetic layers are disposed with the intermediate layer therebetween, and are antiferromagnetically exchange-coupled to each other via the intermediate layer. The heat sink is mainly formed of the metal-based magnetic material of which the two ferromagnetic layers are made. Typically, the magnetic pole, which is a principal element of the write head section, is also formed of a metal-based magnetic material. The present invention thus makes it possible that, when the medium facing surface is formed by polishing, the heat sink is polished by an amount almost the same as the amount of polishing of the magnetic pole. As a result, in the medium facing surface, the respective end faces of the contact sensor and the heat sink are prevented from being recessed or protruded relative to the end face of the write head section. Consequently, it is possible to prevent degradation in the sensitivity of the contact sensor or deterioration in the write characteristics of the write head section.

Furthermore, as described above, the present invention makes it possible to reduce the magnitude of the magnetic field directed toward the recording medium from the end face of the heat sink, when compared with a case where the heat sink consists only of a ferromagnetic layer. The magnetic field directed toward the recording medium from the end face of the heat sink is thus prevented from adversely affecting the recording medium and the write characteristics of the write head section. As can be seen from the descriptions above, the magnetic head, the head assembly, and the magnetic recording device of the present invention make it possible to improve the reliability of the contact sensor without degrading the sensitivity of the contact sensor and without adversely affecting the recording medium and the write characteristics of the write head section.

Other and further objects, features and advantages of the present invention will appear more fully from the following description.

DETAILED DESCRIPTION OF THE PREFERRED EMBODIMENT

Figure 4:
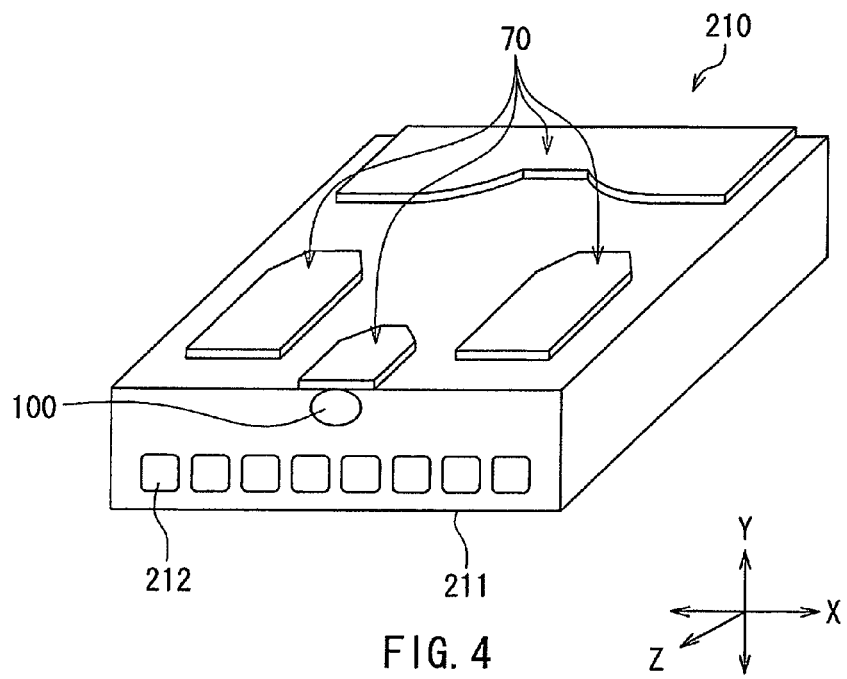
FIG. 4 is a perspective view showing a slider including the magnetic head according to the embodiment of the invention.

A preferred embodiment of the present invention will now be described in detail with reference to the drawings. First, with reference to FIG. 4, a description will be given of a slider 210 including a magnetic head according to the embodiment of the invention. The magnetic head according to the embodiment is for use in perpendicular magnetic recording. In a magnetic recording device, the slider 210 is disposed to face a circular-plate-shaped recording medium (a magnetic disk) that is driven to rotate. In FIG. 4, the X direction is a direction across the tracks of the recording medium, i.e., the track width direction. The Y direction is a direction perpendicular to the surface of the recording medium. The Z direction is the direction of travel of the recording medium as viewed from the slider 210. The X, Y, and Z directions are orthogonal to one another. The slider 210 has a base body 211. The base body 211 is nearly hexahedron-shaped. One of the six surfaces of the base body 211 is designed to face the surface of the recording medium. At this one of the six surfaces, there is formed a medium facing surface 70 to face the recording medium. When the recording medium rotates and travels in the Z direction, an airflow passing between the recording medium and the slider 210 causes a lift below the slider 210 in the Y direction of FIG. 4. The lift causes the slider 210 to fly over the surface of the recording medium. The magnetic head 100 according to the embodiment is formed near the air-outflow-side end (the end in the Z direction) of the slider 210. A plurality of terminals 212 are also provided at the air-outflow-side end of the slider 210.

A head assembly according to the embodiment will now be described with reference to FIG. 5. The head assembly according to the embodiment includes the slider 210 shown in FIG. 4 and a supporter that flexibly supports the slider 210. Forms of the head assembly include a head gimbal assembly and a head arm assembly described below.

First, a description will be given of the head gimbal assembly 220. The head gimbal assembly 220 includes the slider 210, and a suspension 221 serving as the supporter that flexibly supports the slider 210. The suspension 221 includes: a plate-spring-shaped load beam 222 formed of, e.g., stainless steel; a flexure 223 to which the slider 210 is joined, the flexure 223 being provided at an end of the load beam 222 and giving an appropriate degree of freedom to the slider 210; and a base plate 224 provided at the other end of the load beam 222. The base plate 224 is configured to be attached to an arm 230 of an actuator for moving the slider 210 along the X direction across the tracks of the recording medium 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms with a plurality of head gimbal assemblies 220 respectively attached to the arms is called a head stack assembly.

Figure 5:
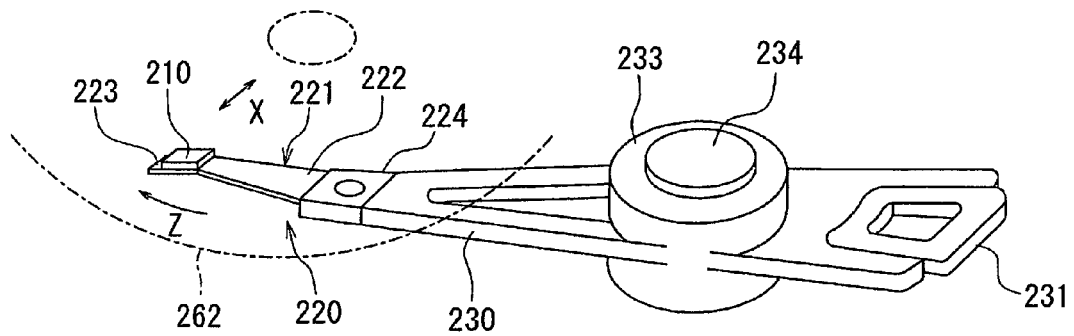
FIG. 5 is a perspective view showing a head arm assembly according to the embodiment of the invention.

FIG. 5 shows the head arm assembly according to the embodiment. In the head arm assembly, the head gimbal assembly 220 is attached to an end of the arm 230. A coil 231 that forms part of the voice coil motor is fixed to the other end of the arm 230. A bearing 233 is provided in the middle of the arm 230. The bearing 233 is attached to a shaft 234 for rotatably supporting the arm 230.

Figure 6:
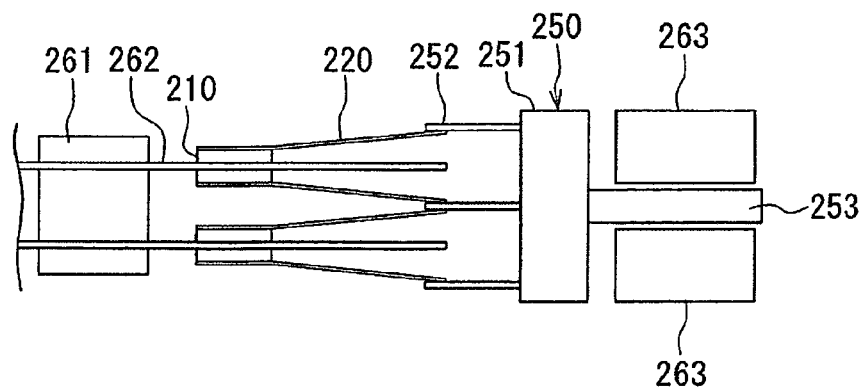
FIG. 6 is an explanatory diagram for illustrating the main part of a magnetic recording device according to the embodiment of the invention.
Figure 7:
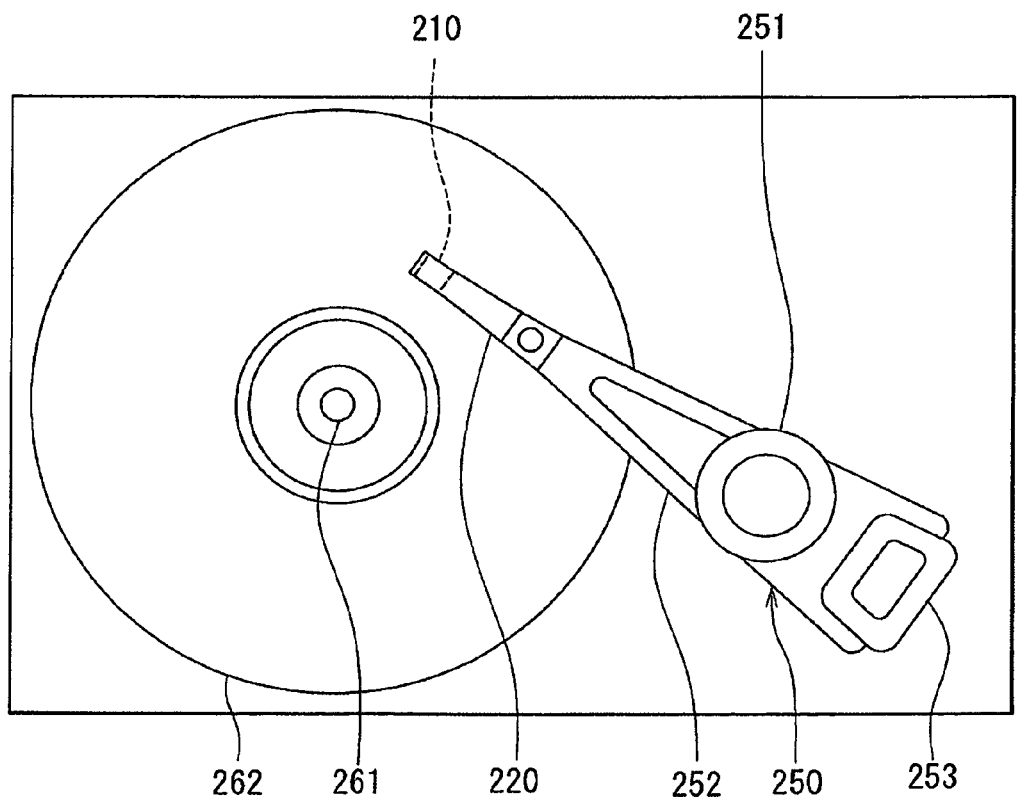
FIG. 7 is a plan view of the magnetic recording device according to the embodiment of the invention.

Reference is now made to FIG. 6 and FIG. 7 to describe an example of the head stack assembly and an example of a magnetic recording device according to the embodiment. FIG. 6 is an explanatory diagram showing the main part of the magnetic recording device. FIG. 7 is a plan view of the magnetic recording device. The head stack assembly 250 includes a carriage 251 having a plurality of arms 252. A plurality of head gimbal assemblies 220 are attached to the arms 252 such that the assemblies 220 are aligned in the vertical direction with spacing between every adjacent ones. A coil 253 forming part of the voice coil motor is mounted on a side of the carriage 251 opposite from the arms 252. The head stack assembly 250 is installed in the magnetic recording device. The magnetic recording device includes a plurality of recording media 262 mounted on a spindle motor 261. Two sliders 210 are allocated to each recording medium 262 such that the two sliders 210 are opposed to each other with the recording medium 262 interposed therebetween. The voice coil motor includes permanent magnets 263 arranged to be opposed to each other with the coil 253 of the head stack assembly 250 interposed therebetween. The actuator and the head stack assembly 250 except the sliders 210 support the sliders 210 and position them with respect to the recording media 262. Note that the magnetic recording device of the present invention may be configured otherwise than the above-described configuration. For example, the magnetic recording device of the present invention may be provided with a single recording medium 262 and one or two head gimbal assemblies 220.

In the magnetic recording device according to the embodiment, the actuator moves the slider 210 across the tracks of the recording medium 262 and positions the slider 210 with respect to the recording medium 262. The magnetic head included in the slider 210 writes data on the recording medium 262 using the write head section, and reads data stored on the recording medium 262 using the read head section.

Figure 1:
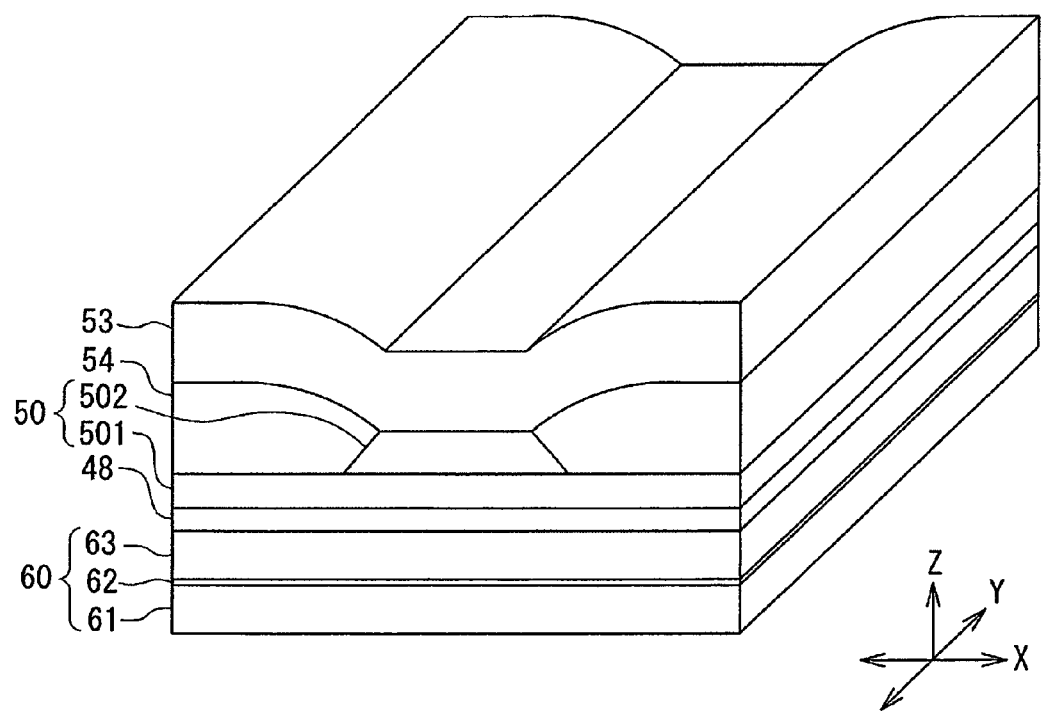
FIG. 1 is a perspective view showing the main part of a magnetic head according to an embodiment of the invention.
Figure 2:
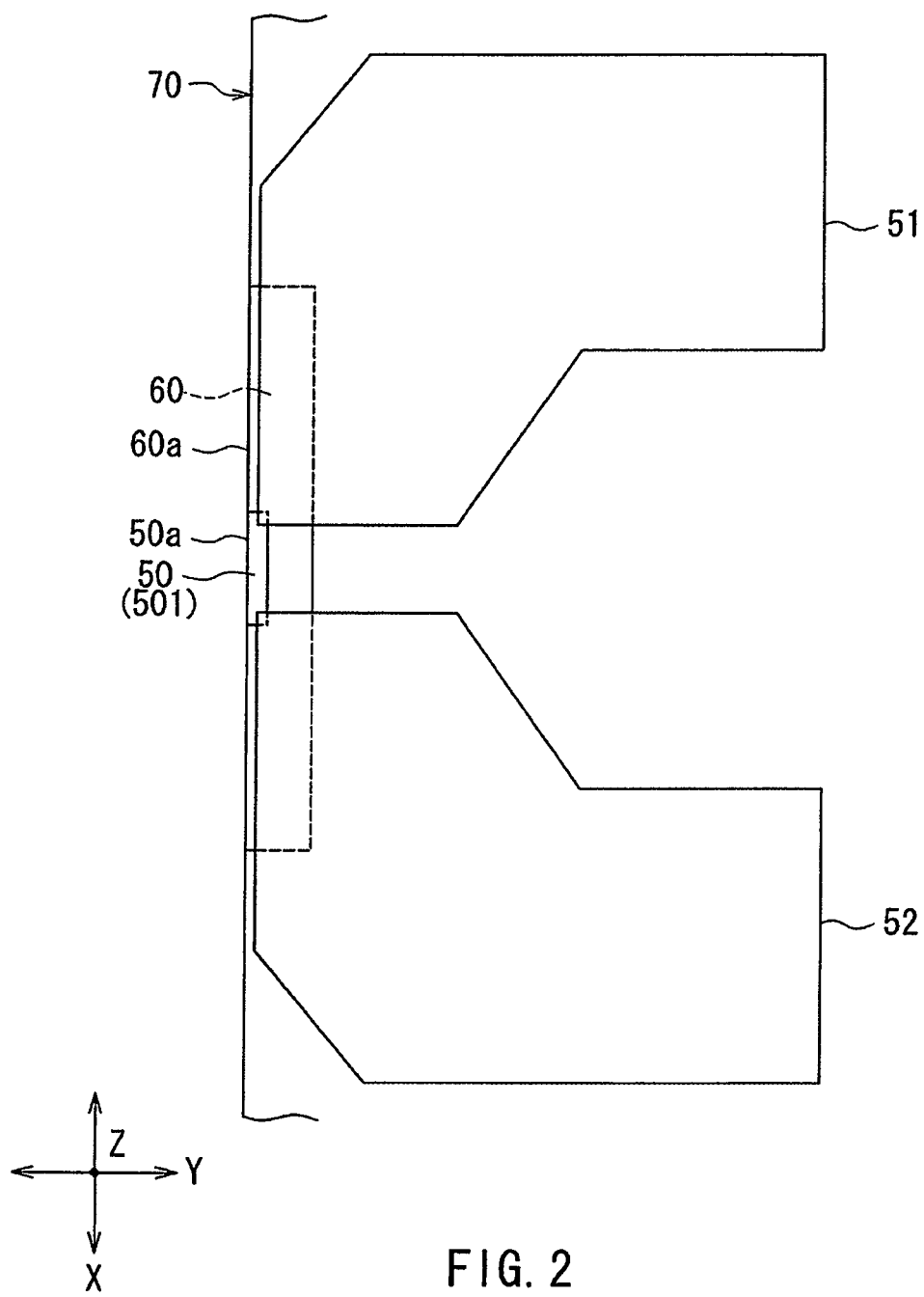
FIG. 2 is a plan view showing the main part of the magnetic head according to the embodiment of the invention.
Figure 3:
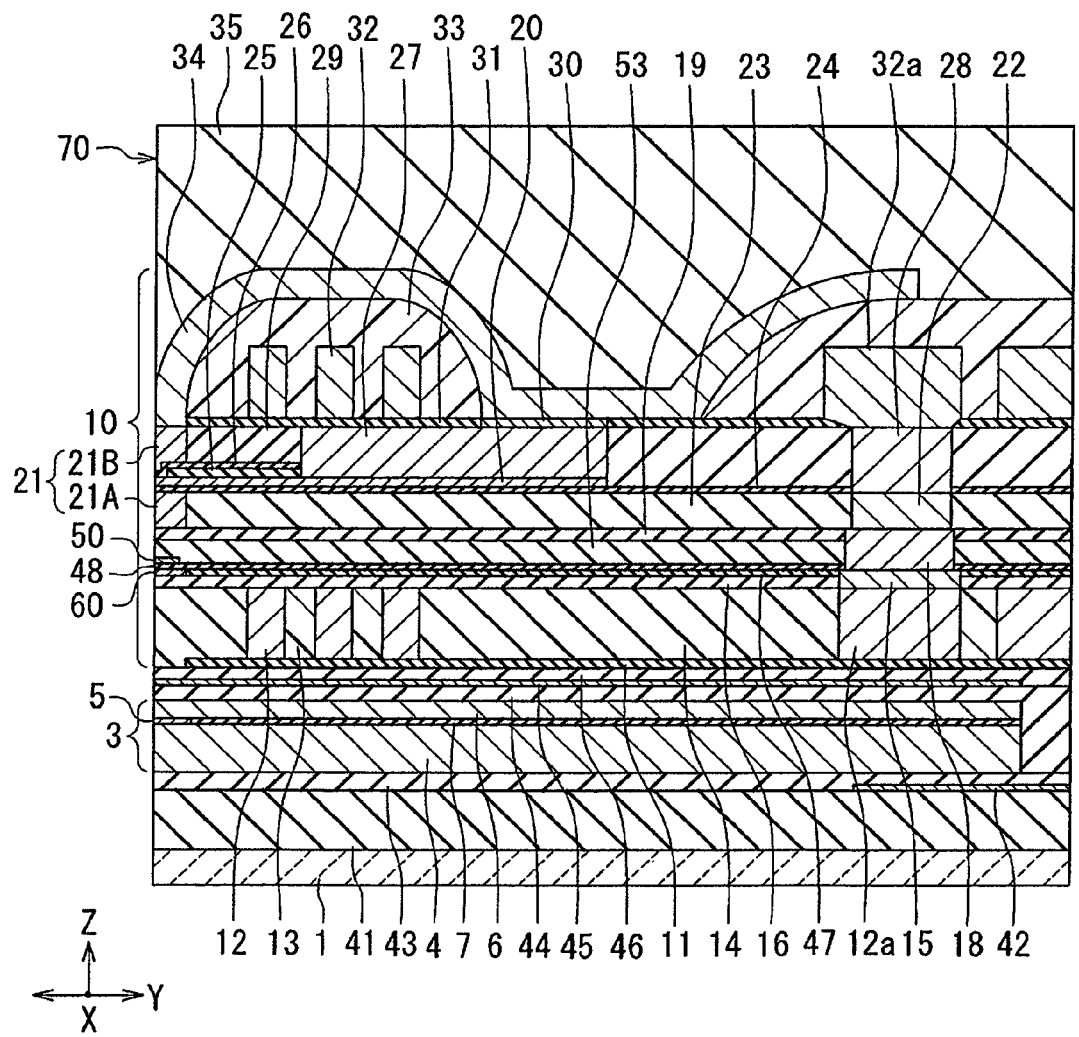
FIG. 3 is a cross-sectional view showing the configuration of the magnetic head according to the embodiment of the invention.

Reference is now made to FIG. 1 to FIG. 3 to describe the configuration of the magnetic head according to the embodiment. FIG. 1 is a perspective view showing the main part of the magnetic head. FIG. 2 is a plan view showing the main part of the magnetic head. FIG. 3 is a cross-sectional view showing the configuration of the magnetic head. Note that FIG. 3 shows a cross section perpendicular to the medium facing surface and the top surface of the substrate. The X, Y, and Z directions shown in FIG. 4 are also shown in FIG. 1 to FIG. 3. In FIG. 2, the Z direction is orthogonal to the X and Y directions. In FIG. 3, the X direction is orthogonal to the Y and Z directions.

As shown in FIG. 3, the magnetic head according to the embodiment has the medium facing surface 70 facing the surface of the recording medium. The magnetic head includes: a substrate 1 made of a ceramic material such as aluminum oxide-titanium carbide ($Al_2O_3$—TiC) and having a top surface; an insulating layer 41 made of an insulating material and disposed on the top surface of the substrate 1; a heater 42 disposed on the insulating layer 41; and an insulating layer 43 made of an insulating material and disposed to cover the insulating layer 41 and the heater 42. The insulating layers 41 and 43 are made of alumina ($Al_2O_3$), for example. The heater 42 generates heat for causing part of the medium facing surface 70 to protrude.

The magnetic head further includes a read head section 3 disposed forward of the heater 42 along the direction of travel of the recording medium. The read head section 3 includes: a bottom read shield layer 4 made of a magnetic material and disposed on the insulating layer 43; a magnetoresistive element (hereinafter referred to as MR element) 5 disposed on the bottom read shield layer 4; a top read shield layer 6 made of a magnetic material and disposed on the MR element 5; and an insulating layer 7 made of an insulating material and disposed between the bottom read shield layer 4 and the top read shield layer 6 to surround the MR element 5. The insulating layer 7 is made of alumina, for example.

An end of the MR element 5 is located in the medium facing surface 70. The MR element 5 may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 5 is a TMR element or a CPP-type GMR element, the bottom read shield layer 4 and the top read shield layer 6 may also serve as electrodes for feeding the sense current to the MR element 5. If the MR element 5 is a CIP-type GMR element, insulating films are respectively provided between the MR element 5 and the bottom read shield layer 4 and between the MR element 5 and the top read shield layer 6, and two leads are provided between these insulating films in order to feed the sense current to the MR element 5.

The magnetic head further includes: a write head section 10 disposed forward of the read head section 3 along the direction of travel of the recording medium; and an intermediate layer 45 and insulating layers 44 and 46 disposed between the read head section 3 and the write head section 10. The insulating layer 44 is made of an insulating material and disposed to cover the read head section 3. The intermediate layer 45 is made of a magnetic material and disposed on the insulating layer 44. The intermediate layer 45 functions to shield the MR element 5 from a magnetic field produced in the write head section 10. The insulating layer 46 is made of an insulating material and disposed on the intermediate layer 45. The insulating layers 44 and 46 are made of alumina, for example.

The write head section 10 includes: an insulating layer 11 made of an insulating material and disposed on the insulating layer 46; a coil 12 made of a conductive material and disposed on the insulating layer 11; an insulating layer 13 made of an insulating material and filling the space between every adjacent turns of the coil 12; and an insulating layer 14 made of an insulating material and disposed around the coil 12. The coil 12 is planar spiral-shaped. The coil 12 includes a connecting portion 12a which is a portion near the inner end of the coil 12 and electrically connected to another coil described later. The insulating layers 11 and 14 are made of alumina, for example. The insulating layer 13 is made of photoresist, for example. The top surfaces of the coil 12 and the insulating layers 13 and 14 are even with each other.

The write head section 10 further includes a connecting layer 15 made of a conductive material and disposed on the connecting portion 12a, and an insulating layer 16 made of an insulating material and disposed around the connecting layer 15. The connecting layer 15 has a top surface located at a higher level than the top surface of the insulating layer 16. The insulating layer 16 is made of alumina, for example.

The magnetic head further includes: a heat sink 60 disposed on the insulating layer 16 in the vicinity of the medium facing surface 70; an insulating layer 47 made of an insulating material and disposed around the connecting layer 15 and the heat sink 60; an insulating film 48 made of an insulating material and disposed over the heat sink 60 and the insulating layer 47; a contact sensor 50 disposed over the heat sink 60 with the insulating film 48 therebetween; and two lead layers 51 and 52 electrically connected to the contact sensor 50. The lead layers 51 and 52 are made of a conductive material such as copper. The contact sensor 50 is to detect contact of the medium facing surface 70 with the surface of the recording medium. The contact sensor 50 and the heat sink 60 will be described in detail later.

As shown in FIG. 1, the magnetic head further includes a protective film 53 made of an insulating material and disposed to be in contact with a portion of the top surface of the contact sensor 50, and an insulating film 54 made of an insulating material and interposed between the protective film 53 and another portion of the top surface of the contact sensor 50. The lead layers 51 and 52 are embedded in the protective film 53 and the insulating film 54. The protective film 53 is made of $TiO_2$, for example. The insulating film 54 is made of alumina, for example.

The write head section 10 further includes: a connecting layer 18 made of a conductive material and disposed on the connecting layer 15; and an insulating layer 19 made of an insulating material and disposed on the protective film 53 to surround the connecting layer 18. The connecting layer 18 is embedded in a layered structure consisting of the insulating film 48, the protective film 53 and the insulating layer 19. The top surfaces of the connecting layer 18 and the insulating layer 19 are even with each other. The insulating layer 19 is made of alumina, for example.

The write head section 10 further includes a magnetic pole 20 and a write shield 21 each made of a metal-based magnetic material. The magnetic pole 20 has an end face located in the medium facing surface 70. The write shield 21 has an end face that is located in the medium facing surface 70 to wrap around the end face of the magnetic pole 20. The magnetic pole 20 and the write shield 21 may be made of any of NiFe, CoFe, CoNiFe, CoNi, FeCo, and FeNi, for example.

The write shield 21 includes a bottom shield 21A, a top shield 21B and not-shown two side shields that are magnetically coupled to each other. The two side shields are located on opposite sides of the magnetic pole 20 in the track width direction (the X direction). The bottom shield 21A is located backward of the two side shields along the direction of travel of the recording medium. The top shield 21B are located forward of the two side shields along the direction of travel of the recording medium.

The bottom shield 21A has an end face that is located in the medium facing surface 70 at a position backward of the end face of the magnetic pole 20 along the direction of travel of the recording medium. The top shield 21B has an end face that is located in the medium facing surface 70 at a position forward of the end face of the magnetic pole 20 along the direction of travel of the recording medium. The two side shields have two end faces that are located in the medium facing surface 70 at positions on opposite sides of the end face of the magnetic pole 20 in the track width direction.

The bottom shield 21A is disposed on the insulating layer 19. The write head section 10 further includes a connecting layer 22 made of a conductive material and disposed on the connecting layer 18, and an insulating layer 23 made of an insulating material and disposed around the bottom shield 21A and the connecting layer 22. The top surfaces of the bottom shield 21A, the connecting layer 22 and the insulating layer 23 are even with each other. The insulating layer 23 is made of alumina, for example.

Although not illustrated, the two side shields are disposed on the bottom shield 21A and are in contact with the bottom shield 21A. The write head section 10 further includes a first gap layer 24 disposed to extend along sidewalls of the two side shields, the top surface of the bottom shield 21A and the top surface of the insulating layer 23. The first gap layer 24 has an opening for exposing the top surface of the connecting layer 22. The first gap layer 24 is made of a nonmagnetic insulating material such as alumina.

The magnetic pole 20 is disposed over the bottom shield 21A and the insulating layer 23 such that the first gap layer 24 is interposed between the magnetic pole 20 and each of the bottom shield 21A, the insulating layer 23, and the two side shields.

The write head section 10 further includes a nonmagnetic layer 25 made of a nonmagnetic material and disposed on part of the top surface of the magnetic pole 20, and a second gap layer 26 disposed over part of the magnetic pole 20 and the nonmagnetic layer 25. A portion of the top surface of the magnetic pole 20 away from the medium facing surface 70 is not covered with the nonmagnetic layer 25 and the second gap layer 26. The nonmagnetic layer 25 is made of an inorganic insulating material or a metal material, for example. The second gap layer 26 is made of a nonmagnetic material such as alumina.

The top shield 21B is disposed over the two side shields and the second gap layer 26, and is in contact with the two side shields. In the medium facing surface 70, part of the end face of the top shield 21B is separated from the end face of the magnetic pole 20 by a predetermined distance created by the thickness of the second gap layer 26. The thickness of the second gap layer 26 is preferably 200 nm or smaller, and more preferably falls within the range of 25 to 50 nm.

The write head section 10 further includes: a yoke layer 27 made of a magnetic material and disposed on the magnetic pole 20 at a position away from the medium facing surface 70; a connecting layer 28 made of a conductive material and disposed on the connecting layer 22; and an insulating layer 29 made of an insulating material and disposed around the magnetic pole 20, the top shield 21B, the yoke layer 27, and the connecting layer 28. The top surfaces of the top shield 21B, the yoke layer 27, the connecting layer 28 and the insulating layer 29 are even with each other. The insulating layer 29 is made of alumina, for example.

The write head section 10 further includes: a coupling layer 30 made of a magnetic material and disposed on part of the top surface of the yoke layer 27; and an insulating layer 31 made of an insulating material and disposed over the yoke layer 27 and the insulating layer 29 to surround the coupling layer 30. The insulating layer 31 has an opening for exposing the top surface of the connecting layer 28. The insulating layer 31 is made of alumina, for example.

The write head section 10 further includes a coil 32 made of a conductive material and disposed on the insulating layer 31, and an insulating layer 33 made of an insulating material and disposed to cover the coil 32. The coil 32 is planar spiral-shaped. The coil 32 includes a connecting portion 32a which is a portion near the inner end of the coil 32 and electrically connected to the connecting portion 12a of the coil 12. The connecting portion 32a is disposed on the connecting layer 28 and electrically connected to the connecting portion 12a via the connecting layers 15, 18, 22, and 28. The insulating layer 33 is made of photoresist, for example.

The write head section 10 further includes a return yoke layer 34 made of a magnetic material. The return yoke layer 34 is disposed over the top shield 21B, the coupling layer 30 and the insulating layer 33, and magnetically couples the top shield 21B and the coupling layer 30 to each other.

The magnetic head further includes a protective layer 35 made of an insulating material such as alumina and disposed to cover the write head section 10. The base body 211 of FIG. 4 is mainly composed of the substrate 1 and the protective layer 35 of FIG. 3.

As has been described, the magnetic head according to the embodiment has the medium facing surface 70, the read head section 3, and the write head section 10. The medium facing surface 70 faces the surface of the recording medium. The read head section 3 and the write head section 10 are stacked on the substrate 1. The read head section 3 is disposed backward along the direction of travel of the recording medium (the Z direction) (in other words, disposed on the air-inflow end side of the slider), whereas the write head section 10 is disposed forward along the direction of travel of the recording medium (the Z direction) (in other words, disposed on the air-outflow end side of the slider).

The write head section 10 includes the coil 12, the magnetic pole 20, the write shield 21, the first gap layer 24, the nonmagnetic layer 25, the second gap layer 26, the yoke layer 27, the coupling layer 30, the coil 32, and the return yoke layer 34. The write shield 21 includes the bottom shield 21A, the top shield 21B, and the two side shields.

When a write current is supplied to the coils 12 and 32, magnetic fields produced at the centers of the coils 12 and 32 are in mutually opposite directions. The coil 32 produces a magnetic field corresponding to data to be written on the recording medium. The coil 12 produces a magnetic field that prevents the magnetic field produced by the coil 32 from affecting the read head section 3. Note that the coil 12 is not an essential component of the write head section 10 and can be dispensed with.

The magnetic pole 20 has the end face located in the medium facing surface 70. The magnetic pole 20 allows a magnetic flux corresponding to the magnetic field produced by the coil 32 to pass, and produces a write magnetic field for writing data on the recording medium by means of a perpendicular magnetic recording system. The position of the end of a bit pattern to be written on the recording medium depends on the position of an edge of the end face of the magnetic pole 20 located in the medium facing surface 70, the edge being closer to the second gap layer 26.

The magnetic head according to the embodiment further includes the heater 42, the contact sensor 50, and the heat sink 60. The contact sensor 50 and the heat sink 60 are disposed between the MR element 5 of the read head section 3 and the magnetic pole 20 of the write head section 10. Relative to the contact sensor 50 and the heat sink 60, the heater 42 is located backward along the direction of travel of the recording medium.

A detailed description will now be given of the heater 42, the contact sensor 50, and the heat sink 60. The heater 42 will be described first. The heater 42 generates heat for causing part of the medium facing surface 70 to protrude. The components of the magnetic head expand with the heat generated by the heater 42, thereby causing part of the medium facing surface 70 to protrude. This reduces the distance from the read head section 3 and the write head section 10 to the surface of the recording medium.

The heater 42 is made of a conductive material, such as metal, which generates heat when energized. The heater 42 is formed of, for example, a film of NiCr or a layered film consisting of Ta, NiCu, and Ta films. The amount of protrusion of the part of the medium facing surface 70 can be controlled by adjusting the magnitude of the current passed through the heater 42.

Next, the contact sensor 50 will be described with reference to FIG. 1 and FIG. 2. The contact sensor 50 is to detect contact of the medium facing surface 70 with the surface of the recording medium. As shown in FIG. 2, the contact sensor 50 has an end face 50a located in the medium facing surface 70. In the example shown in FIG. 1 and FIG. 2, the contact sensor 50 includes a first portion 501 located on the insulating film 48 and a second portion 502 located on the first portion 501. The first portion 501 has the shape of a rectangular solid that is elongated in the track width direction (the X direction). The second portion 502 is smaller than the first portion 501 in dimension in the X direction, and is located on a center portion of the top surface of the first portion 501 in the X direction. The lead layers 51 and 52 are electrically connected to opposite ends of the first portion 501 in the track width direction. Note that the shape of the contact sensor 50 is not limited to the example shown in FIG. 1 and FIG. 2. For example, the contact sensor 50 may consist only of the first portion 501.

The contact sensor 50 varies in resistance in response to temperature variations, and is to be energized. The contact sensor 50 is formed of a metal material that varies in resistance at a considerable rate with respect to a change in temperature, i.e., that has a considerable temperature coefficient of resistance. More specifically, the contact sensor 50 is formed of a metal film of one of Ni, Ti, W, Pt, Ta, Ru, and Au, or of an alloy or a layered film that contains at least one of these elements.

When the medium facing surface 70 comes into contact with the surface of the recording medium, the frictional heat resulting from the contact raises the temperature of the medium facing surface 70 at and in the vicinity of the part in contact with the surface of the recording medium. Such a rise in temperature also raises the temperature of the contact sensor 50 itself. As a result, the contact sensor 50 varies in resistance. Measuring the resistance of the contact sensor 50 or any parameter corresponding thereto thus allows for detecting that the medium facing surface 70 has come into contact with the surface of the recording medium. The contact sensor 50 is energized through the lead layers 51 and 52. A variation in resistance of the contact sensor 50 is detected, for example, as a variation in voltage drop in the contact sensor 50. If the contact sensor 50 has a positive temperature coefficient of resistance, the temperature and the resistance of the contact sensor 50 suddenly rise when the medium facing surface 70 comes into contact with the surface of the recording medium. As a result, with a constant current flowing through the contact sensor 50, the contact sensor 50 experiences a sudden increase in voltage drop.

Next, the heat sink 60 will be described with reference to FIG. 1 and FIG. 2. As shown in FIG. 1, the heat sink 60 is provided adjacent to the contact sensor 50. The heat sink 60 has the shape of, for example, a rectangular solid that is elongated in the track width direction (the X direction), as shown in FIG. 2. The heat sink 60 has an end face 60a located in the medium facing surface 70. The heat sink 60 is shaped to be larger than the contact sensor 50 when viewed in the Z direction, and has a volume sufficiently larger than that of the contact sensor 50. The heat sink 60 has a dimension in the X direction of 0.1 to 50 μm, for example. The heat sink 60 has a dimension in the Y direction of 0.05 to 10 μm, for example. The heat sink 60 has a dimension in the Z direction of 5 to 500 nm, for example.

As shown in FIG. 1, the heat sink 60 includes an intermediate layer 62 made of a nonmagnetic metal material, and two ferromagnetic layers 61 and 63 that are made of a metal-based magnetic material and are disposed with the intermediate layer 62 therebetween. The ferromagnetic layer 61 is disposed between the insulating layer 16 and the intermediate layer 62. The ferromagnetic layer 63 is disposed between the intermediate layer 62 and the insulating film 48. The ferromagnetic layers 61 and 63 are antiferromagnetically exchange-coupled to each other via the intermediate layer 62 by the RKKY interaction. The intermediate layer 62 contains at least one of Ru, Rh, Ir, Cr, Cu, Ag, Au, Pt, and Pd, for example. The ferromagnetic layers 61 and 63 may be made of any of, for example, NiFe, CoFe, CoNiFe, CoNi, FeCo, and FeNi, like the magnetic pole 20 and the write shield 21. Each of the ferromagnetic layers 61 and 63 may be a stack of a plurality of films that are made of different materials.

Whether or not the ferromagnetic layers 61 and 63 are antiferromagnetically exchange-coupled to each other via the intermediate layer 62 by the RKKY interaction depends on the material and thickness of the intermediate layer 62. While various thicknesses are possible for the intermediate layer 62 to allow the ferromagnetic layers 61 and 63 to be antiferromagnetically exchange-coupled to each other, the minimum one of those thicknesses is preferably selected. The intermediate layer 62 is sufficiently smaller in thickness than the ferromagnetic layers 61 and 63. Accordingly, the heat sink 60 is mainly formed of the material of the ferromagnetic layers 61 and 63, that is, a metal-based magnetic material.

The periphery of the heat sink 60 may be completely covered with an insulator or in contact with another electrically conductive layer. In order to prevent electrical charges from building up, the heat sink 60 may be connected to the ground via another electrically conductive layer.

The function and effects of the magnetic head according to the embodiment will now be described. The magnetic head writes data on the recording medium using the write head section 10 and reads data stored on the recording medium using the read head section 3. According to the embodiment, the operation of the heater 42 described above causes part of the medium facing surface 70 to protrude. This allows for reducing the distance from the read head section 3 and the write head section 10 to the surface of the recording medium. Furthermore, according to the embodiment, it is possible with the contact sensor 50 to detect contact of the medium facing surface 70 with the surface of the recording medium.

In the embodiment, the heat sink 60 is provided adjacent to the contact sensor 50. The heat sink 60 is formed of metal materials (a metal-based magnetic material and a nonmagnetic metal material) which are higher in thermal conductivity than insulators (the insulating layers 16 and 47, the insulating films 48 and 54, and the protective film 53) disposed around the contact sensor 50 and the heat sink 60. According to the embodiment, it is thus possible with the heat sink 60 to dissipate heat that the contact sensor 50 generates when energized. Consequently, according to the embodiment, it is possible to provide improved reliability of the contact sensor 50.

As an indicator indicative of the reliability of the contact sensor 50, the following Black's equation (1) can be used which is generally employed to infer the service life of conductors in semiconductor circuits. Now, using the Black's equation, it will be demonstrated that the embodiment allows the contact sensor 50 to provide improved reliability.

$$MTTF = A \cdot j^{-n} \cdot e^{(Q/kT)} \qquad (1)$$

In Equation (1) above, MTTF represents the average failure time for a conductor to fail due to electromigration. Furthermore, A represents the constant, j represents the current density of the conductor, n represents a parameter indicative of the dependency of the conductor service life on the current density, Q represents the activation energy, k represents the Boltzmann constant, and T represents the absolute temperature of the conductor. As can be seen from Equation (1), the higher the current density j and the higher the absolute temperature T, the shorter the MTTF becomes.

According to the embodiment, it is possible with the heat sink 60 to dissipate heat that the contact sensor 50 generates when energized. This makes it possible to make the absolute temperature T of the contact sensor 50 lower than that in the case without the heat sink 60. As such, the embodiment allows the MTTF of the contact sensor 50 corresponding to the service life of the contact sensor 50 to be longer than in the case without the heat sink 60. According to the embodiment, the provision of the heat sink 60 thus makes it possible to improve the reliability of the contact sensor 50.

In the contact sensor 50, a variation in resistance is detected, for example, as a variation in voltage drop. For such a contact sensor 50, increasing the applied voltage to the contact sensor 50 can improve the performance, such as sensitivity and signal-to-noise ratio, of the contact sensor 50. On the other hand, however, an increase in the applied voltage to the contact sensor 50 increases the current density of the contact sensor 50 and also increases the amount of heat generated by the contact sensor 50 itself. This causes electromigration to become noticeable and results in a reduction in service life of the contact sensor 50 as can be seen from Equation (1), thus leading to degradation in reliability of the contact sensor 50. Note that the applied voltage to the contact sensor 50 refers to a voltage that is applied to the contact sensor 50 when the medium facing surface 70 is not in contact with the surface of the recording medium. When the medium facing surface 70 comes into contact with the surface of the recording medium, for example, the resistance of the contact sensor 50 suddenly increases as described previously, so that a voltage drop in the contact sensor 50, that is, the voltage across the contact sensor 50, is suddenly increased.

According to the embodiment, as mentioned above, the provision of the heat sink 60 allows the absolute temperature T of the contact sensor 50 to be lower than in the case without the heat sink 60. Thus, when compared with the case without the heat sink 60, the embodiment makes it possible to raise the upper limit of the applied voltage to the contact sensor 50 under the condition that the contact sensor 50 can have an MTTF of a desired value or greater. Consequently, when compared with the case without the heat sink 60, the embodiment makes it possible to improve the contact sensor 50 in performance such as sensitivity and signal-to-noise ratio by increasing the applied voltage to the contact sensor 50 while ensuring an MTTF of a desired value or greater for the contact sensor 50. According to an example of simulations using Equation (1), the upper limit of the applied voltage to the contact sensor 50 under the condition that an MTTF of the same value or greater is available is about 350 mV in the case where the heat sink 60 is provided, and is about 150 mV in the case without the heat sink 60.

To make effective use of the heat sink 60, the distance between the contact sensor 50 and the heat sink 60 is preferably small. If the contact sensor 50 and the heat sink 60 are in contact with each other, however, part of the electric current passed through the contact sensor 50 by the lead layers 51 and 52 may flow into the heat sink 60 to cause degradation of the sensitivity of the contact sensor 50. To avoid this, in the embodiment, the insulating film 48 is provided between the contact sensor 50 and the heat sink 60 to insulate the contact sensor 50 and the heat sink 60 from each other. Since the distance between the contact sensor 50 and the heat sink 60 is preferably small as mentioned above, the thickness of the insulating film 48 need only be greater than zero.

If the insulating film 48 is too thick, the effective use of the heat sink 60 is not achieved. In this context, the preferable range of the thickness of the insulating film 48 was investigated by simulation. In the simulation, it was assumed that the insulating film 48 was formed of alumina. In the simulation, the temperature of the contact sensor 50 was first determined with the applied voltage to the contact sensor 50 set at 150 mV under the conditions that no heat sink 60 was provided and the contact sensor 50 was embedded in an insulator of alumina. The temperature was found to be 81.6° C.

In the simulation, then, the relationship between the thickness of the insulating film 48 and the temperature of the contact sensor 50 with the applied voltage to the contact sensor 50 set at 150 mV was investigated under the same conditions as those with the case without the heat sink 60 except that the heat sink 60 was provided adjacent to the contact sensor 50 with the insulating film 48 of alumina thterebetween.

Figure 8:
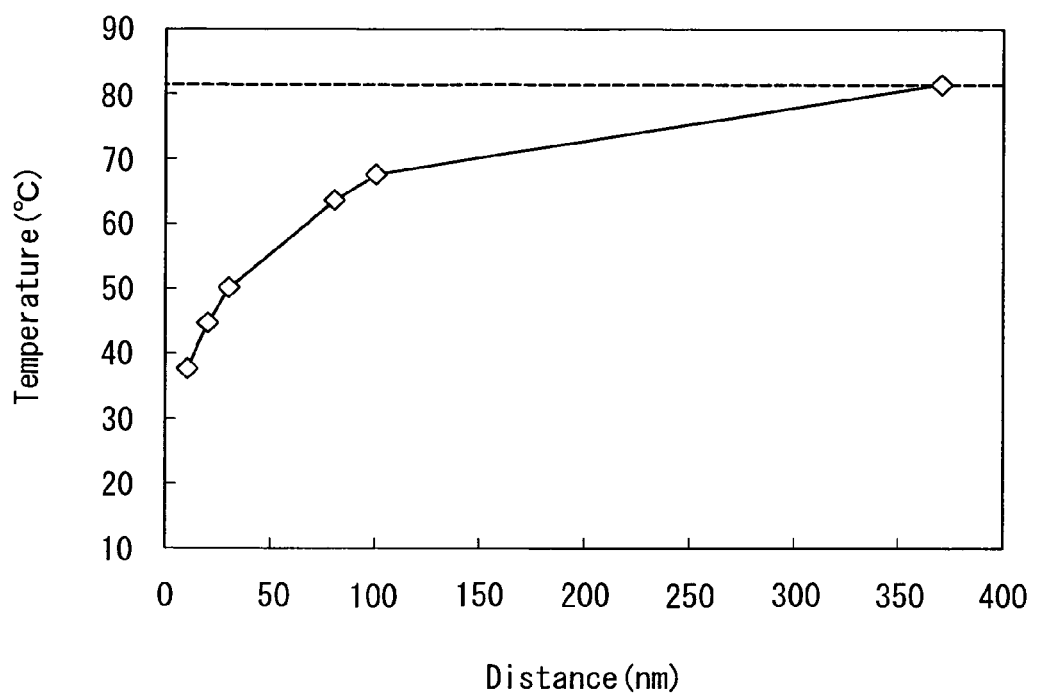
FIG. 8 is a characteristic chart showing an example of the relationship between the temperature of the contact sensor and the distance between the contact sensor and the heat sink.

The simulation results are shown in FIG. 8. In FIG. 8, the horizontal axis represents the distance between the contact sensor 50 and the heat sink 60, i.e., the thickness of the insulating film 48 (in nm), and the vertical axis represents the temperature of the contact sensor 50 (in °C.). Furthermore, in FIG. 8, the broken line indicates the level of the 81.6° C. temperature of the contact sensor 50 under the foregoing condition that no heat sink 60 is provided. In the simulation, the temperature of the contact sensor 50 was 81.6° C. when the distance between the contact sensor 50 and the heat sink 60 was 370 nm. When the aforementioned distance was less than 370 nm, the temperature of the contact sensor 50 was less than 81.6° C. The simulation results indicate that the distance between the contact sensor 50 and the heat sink 60, that is, the thickness of the insulating film 48, is preferably greater than zero and less than 370 nm. Note that this preferable range was obtained under the foregoing specific simulation conditions. Under different conditions, the preferable range of the distance between the contact sensor 50 and the heat sink 60 (the thickness of the insulating film 48) or the upper limit thereof, in particular, may possibly vary. However, since the foregoing specific simulation conditions are so set as to be somewhat practical, the above-mentioned preferable range is thought to be a practically appropriate one.

Now, a description will be given of the effect that the heat sink 60 provides when it is mainly formed of a metal-based magnetic material. First, a manufacturing method for the magnetic head according to the embodiment will be described. In the manufacturing method, first, components of a plurality of magnetic heads are formed on a substrate to fabricate a substructure that includes a plurality rows of pre-slider portions. The pre-slider portions are to become a plurality of sliders later. The substructure is then cut to separate the pre-slider portions from each other into a plurality of sliders. When forming the plurality of sliders, the cut surface is polished into the medium facing surface 70.

In the step of forming the medium facing surface 70 by polishing, the amount of polishing may differ among components of the magnetic head due to differences in materials of the components. Accordingly, consideration must be given especially to the material of the heat sink that is provided adjacent to the contact sensor 50. Otherwise, the amount of polishing of the heat sink in the step of forming the medium facing surface 70 will become greater or smaller than the amounts of polishing of the components of the write head section 10 or the read head section 3. This may cause the end face of the heat sink in the medium facing surface 70 to be recessed or protruded relative to the end face of the write head section 10 or the read head section 3. As a result, the amount of polishing of the contact sensor 50 adjacent to the heat sink may be affected by the amount of polishing of the heat sink, so that the end face 50a of the contact sensor 50 in the medium facing surface 70 may also be recessed or protruded relative to the end face of the write head section 10 or the read head section 3. In such a case, the sensitivity of the contact sensor 50 may be reduced, or the write characteristics of the write head section 10 and the read characteristics of the read head section 3 may deteriorate. More specifically, if the end face of the heat sink and the end face 50a of the contact sensor 50 are recessed relative to the end faces of the write head section 10 and the read head section 3, the sensitivity of the contact sensor 50 will be degraded. On the other hand, if the end face of the heat sink and the end face 50a of the contact sensor 50 are protruded relative to the end faces of the write head section 10 and the read head section 3, the distance between the surface of the recording medium and the respective end faces of the write head section 10 and the read head section 3 in the medium facing surface 70 is not sufficiently small at the point in time at which the contact sensor 50 has detected a contact. Consequently, in this case, the write characteristics of the write head section 10 and the read characteristics of the read head section 3 may deteriorate.

In the embodiment, the heat sink 60 is mainly formed of a metal-based magnetic material, as with the magnetic pole 20 and the write shield 21, which are the principal elements of the write head section 10. This allows the amount of polishing of the heat sink 60 in the step of forming the medium facing surface 70 to be almost the same as that of the magnetic pole 20 and the write shield 21. As a result, according to the embodiment, it is possible to prevent the end face 50a of the contact sensor 50 and the end face 60a of the heat sink 60 from being recessed or protruded relative to the end faces of the write head section 10 and the read head section 3 in the medium facing surface 70. Consequently, the embodiment makes it possible to prevent the sensitivity of the contact sensor 50 from being degraded, and to prevent the write characteristics of the write head section 10 and the read characteristics of the read head section 3 from being deteriorated.

In the embodiment, the protective film 53, which is provided on a side of the contact sensor 50 opposite from the heat sink 60, also functions to prevent the end face 50a of the contact sensor 50 from being recessed or protruded relative to the end faces of the write head section 10 and the read head section 3 in the medium facing surface 70. More specifically, if the insulators around the contact sensor 50 are formed only of alumina, the amount of polishing of those insulators in the step of forming the medium facing surface 70 may be greater than that of the heat sink 60, depending on the polishing conditions. This may possibly cause the end face 50a of the contact sensor 50 to be recessed relative to the end faces of the write head section 10 and the read head section 3. In contrast to this, by forming the protective film 53 from such a material that the amount of polishing thereof is smaller than that of alumina in the step of forming the medium facing surface 70, such as $TiO_2$, it is possible to make the amount of polishing of the aforementioned insulators in the step of forming the medium facing surface 70 be closer to the amount of polishing of the magnetic pole 20 and the write shield 21, which are the principal elements of the write head section 10. This makes it possible to prevent the end face 50a of the contact sensor 50 from being recessed or protruded relative to the end faces of the write head section 10 and the read head section 3 in the medium facing surface 70.

Now, a description will be given of the effects provided by the heat sink 60 having the intermediate layer 62 and the two ferromagnetic layers 61 and 63 wherein the two ferromagnetic layers 61 and 63 are antiferromagnetically exchange-coupled to each other via the intermediate layer 62. Here, a case will be contemplated where a heat sink consisting only of a ferromagnetic layer is provided in place of the heat sink 60 of the embodiment. In such a case, for example, the shape anisotropy of the heat sink or the magnetic fields produced by the coils 12 and 32 may cause the heat sink to be magnetized. As a result, a magnetic field is produced from the end face of the heat sink located in the medium facing surface 70 in a direction toward the recording medium, and the magnetic field may adversely affect the recording medium or the write characteristics of the write head section.

Figure 9:
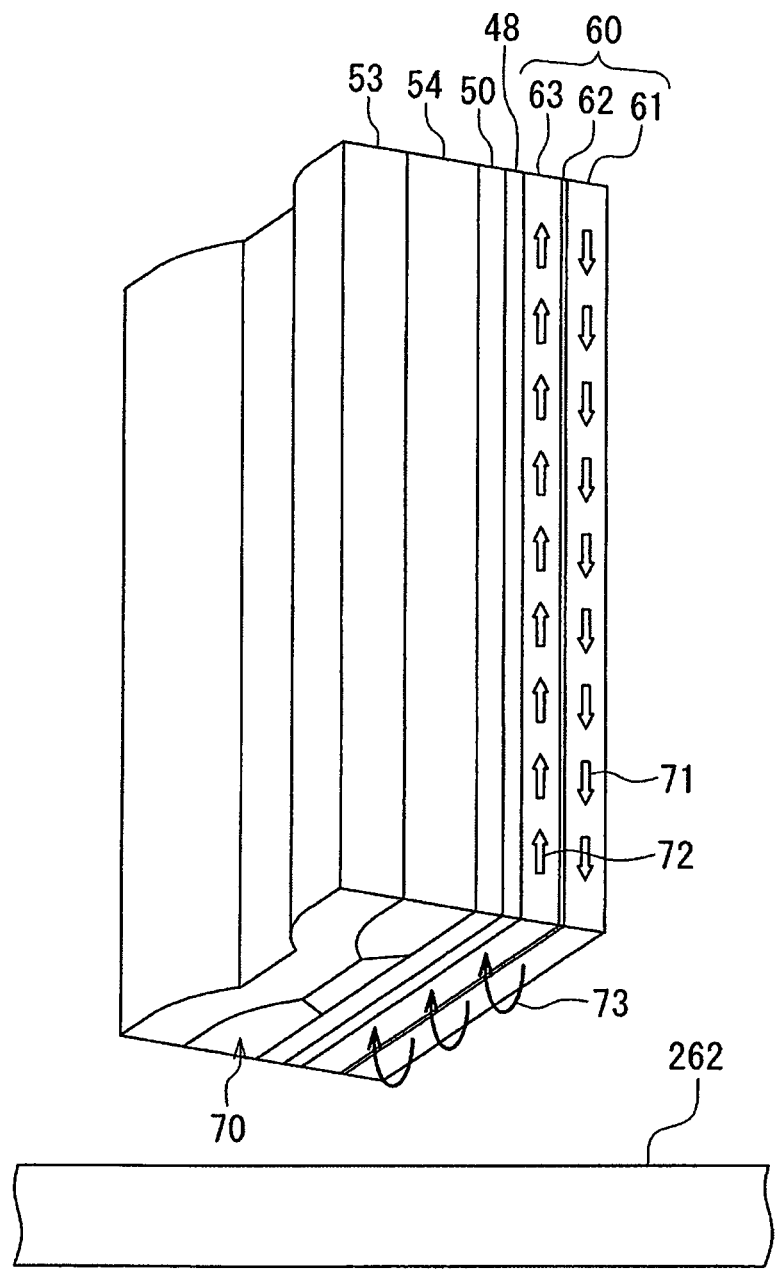
FIG. 9 is an explanatory diagram illustrating the state of magnetization of the two ferromagnetic layers of the heat sink of the embodiment of the invention.

In contrast to this, the heat sink 60 of the embodiment includes the two ferromagnetic layers 61 and 63 which are antiferromagnetically exchange-coupled to each other via the intermediate layer 62. Accordingly, when compared with a heat sink that consists only of a ferromagnetic layer, the heat sink 60 is capable of reducing the magnitude of the magnetic field that is directed toward the recording medium from the end face 60a of the heat sink 60. This will be described in more detail with reference to FIG. 9. FIG. 9 is an explanatory diagram illustrating the state of magnetization of the two ferromagnetic layers 61 and 63 of the heat sink 60. In FIG. 9, the arrows denoted with symbol 71 indicate the direction of magnetization of the ferromagnetic layer 61; the arrows denoted with symbol 72 indicate the direction of magnetization of the ferromagnetic layer 63; and the arrows denoted with symbol 73 indicate the magnetic field generated from the end face 60a of the heat sink 60.

When the coils 12 and 32 are energized, the magnetic fields produced by the coils 12 and 32 have such an effect as to cause magnetizations 71 and 72 to appear in the ferromagnetic layers 61 and 63 as shown in FIG. 9. In the embodiment, since the ferromagnetic layers 61 and 63 are antiferromagnetically coupled to each other, the direction of magnetization 71 of the ferromagnetic layer 61 and the direction of magnetization 72 of the ferromagnetic layer 63 are antiparallel to each other. Accordingly, as shown in FIG. 9, the magnetic field generated from the end face of either one of the ferromagnetic layers 61 and 63 is directed to the end face of the other one. Consequently, according to the embodiment, when compared with the case with a heat sink that consists only of a ferromagnetic layer, it is possible to reduce the magnitude of the magnetic field directed toward the recording medium 262 from the end face 60a of the heat sink 60. The embodiment thus makes it possible that the magnetic field directed toward the recording medium 262 from the end face 60a of the heat sink 60 is prevented from adversely affecting the recording medium 262 or the write characteristics of the write head section 10.

Now, referring to the simulation and experiment results, it will be shown that the heat sink 60 of this embodiment is capable of reducing the magnitude of the magnetic field directed toward the recording medium 262 from the end face 60a of the heat sink 60.

First, a description will be given of the results of a simulation that was performed on a sample of a first practical example and a sample of a first comparative example to investigate the relationship between the external magnetic field and the magnetization-thickness product Mt (the product of the magnetization (M) and the thickness (t) of the sample). The sample of the first practical example corresponds to the heat sink 60 of the embodiment, and has the intermediate layer 62 and the ferromagnetic layers 61 and 63, the layers 61 and 63 being antiferromagnetically exchange-coupled to each other via the intermediate layer 62. The sample of the first comparative example is a single ferromagnetic layer that is formed of the same material as that of the ferromagnetic layers 61 and 63 of the sample of the first practical example, and has a thickness equal to the total thickness of the ferromagnetic layers 61 and 63 of the sample of the first practical example. The sample of the first comparative example and the sample of the first practical example are equal in dimensions except for thickness.

Figure 10:
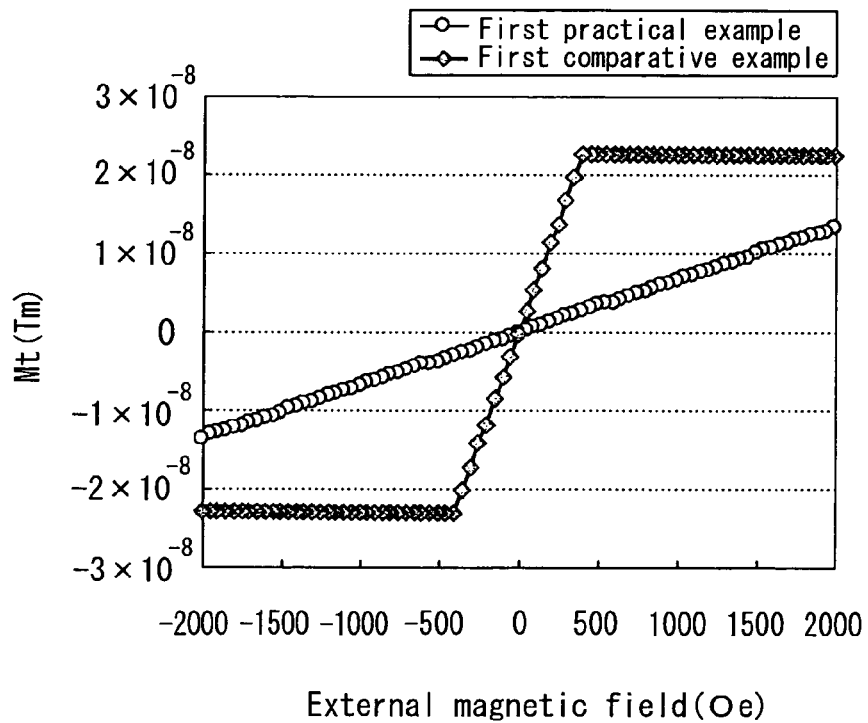
FIG. 10 is a characteristic chart showing the relationship between the external magnetic field and the magnetization-thickness product for the heat sink determined by simulation.

FIG. 10 is a characteristic chart showing the relationship between the external magnetic field and the magnetization-thickness product Mt determined by the simulation. In FIG. 10, the horizontal axis represents the external magnetic field (in Oe), and the vertical axis represents the magnetization-thickness product Mt (in Tm). Note that 1 Oe=79.6 A/m. From FIG. 10, it can be seen that the sample of the first practical example is more resistant to magnetization by the external magnetic field than the sample of the first comparative example. As can be seen from the simulation results, when compared with a heat sink that consists only of a ferromagnetic layer, the heat sink 60 of the embodiment is more resistant to magnetization by the external magnetic field and is thus capable of reducing the magnitude of the magnetic field directed toward the recording medium 262 from the end face 60a of the heat sink 60.

Next, a description will be given of the results of an experiment that was performed on a sample of a second practical example and a sample of a second comparative example to investigate the relationship between the external magnetic field and the magnetization of the sample. The sample of the second practical example corresponds to the heat sink 60 of the embodiment, and has the intermediate layer 62 and the ferromagnetic layers 61 and 63, the layers 61 and 63 being antiferromagnetically exchange-coupled to each other via the intermediate layer 62. The sample of the second comparative example has two ferromagnetic layers, and an intermediate layer disposed therebetween. The two ferromagnetic layers are formed of the same material and have the same shape as the ferromagnetic layers 61 and 63 of the sample of the first practical example. The intermediate layer is formed of a nonmagnetic metal material. The intermediate layer of the sample of the second comparative example has a thickness that does not allow the two ferromagnetic layers to be antiferromagnetically exchange-coupled to each other. Accordingly, in the sample of the second comparative example, the two ferromagnetic layers are not antiferromagnetically coupled to each other.

Figure 11:
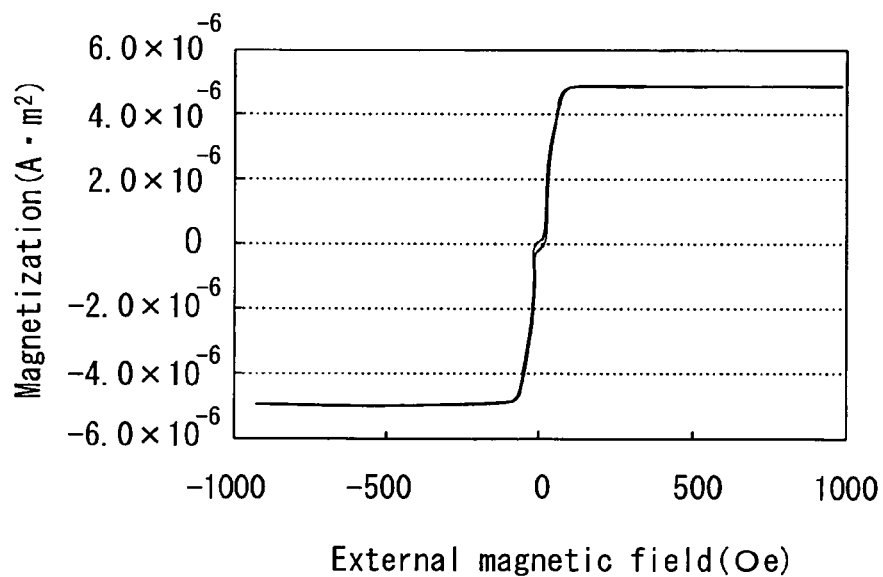
FIG. 11 is a characteristic chart showing the relationship between the external magnetic field and the magnetization for a sample of a second comparative example.
Figure 12:
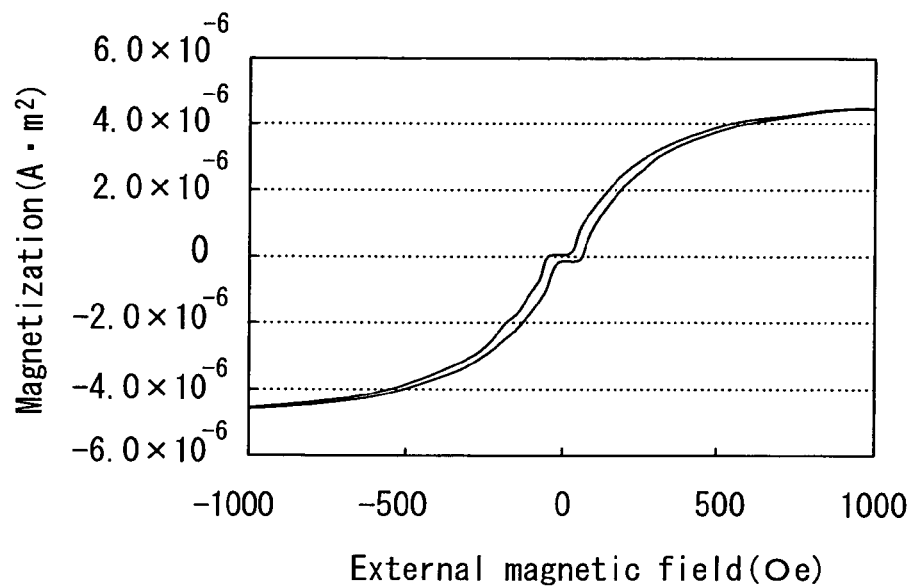
FIG. 12 is a characteristic chart showing the relationship between the external magnetic field and the magnetization for a sample of a second practical example.

FIG. 11 is a characteristic chart showing the relationship between the external magnetic field and the magnetization for the sample of the second comparative example. FIG. 12 is a characteristic chart showing the relationship between the external magnetic field and the magnetization for the sample of the second practical example. In FIG. 11 and FIG. 12, the horizontal axis represents the external magnetic field (in Oe), and the vertical axis represents the magnitude of magnetization (in A·m$^2$). From FIG. 11 and FIG. 12, it can be seen that the sample of the second practical example is more resistant to magnetization by the external magnetic field than the sample of the second comparative example. As can be seen from the experiment results, when compared with a heat sink having two ferromagnetic layers that are not antiferromagnetically coupled to each other, the heat sink 60 of the embodiment is more resistant to magnetization by the external magnetic field and is thus capable of reducing the magnitude of the magnetic field directed toward the recording medium 262 from the end face 60a of the heat sink 60.

Now, a description will be given of the results of a simulation that was performed to investigate the magnitude of the magnetic field generated from the medium facing surface 70 including the end face 60a of the heat sink 60 and the end face of the magnetic pole 20. In the simulation, the magnitude of a component of the magnetic field generated from the medium facing surface 70 in a direction perpendicular to the medium facing surface 70 was determined using three magnetic head models, that is, a model of a third practical example, a model of a third comparative example, and a model of a fourth comparative example, which are described below. The model of the third practical example includes the heat sink 60 of the embodiment. The model of the third comparative example includes a heat sink that consists only of a ferromagnetic layer of NiFe in place of the heat sink 60 of the embodiment. The model of the fourth comparative example includes no heat sink adjacent to the contact sensor 50.

Figure 13:
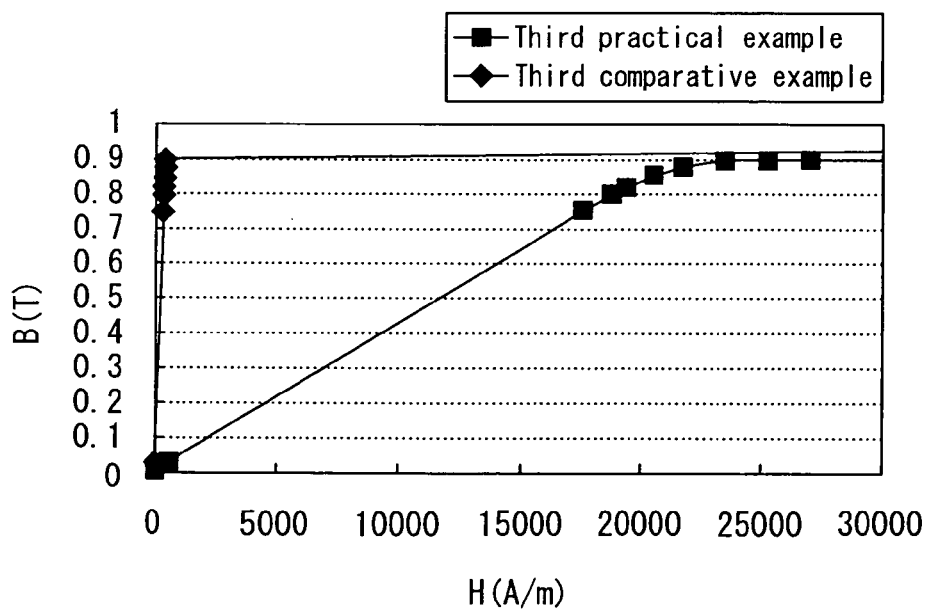
FIG. 13 is a characteristic chart showing the relationship between the external magnetic field and the flux density for heat sinks of a model of a third practical example and a model of a third comparative example.

FIG. 13 is a characteristic chart showing the relationship between the external magnetic field H and the flux density B for each of the heat sink 60 of the model of the third practical example and the heat sink of the model of the third comparative example. In FIG. 13, the horizontal axis represents the external magnetic field H (in A/m), and the vertical axis represents the flux density B (in T). When compared with a heat sink that consists only of a ferromagnetic layer, the heat sink 60 of the embodiment is more resistant to magnetization by the external magnetic field as described above, and is therefore lower in permeability. FIG. 13 shows this fact. In this simulation, the permeability of the heat sink 60 of the model of the third practical example was assumes as 1.7% the permeability of the heat sink of the model of the third comparative example.

Figure 14:
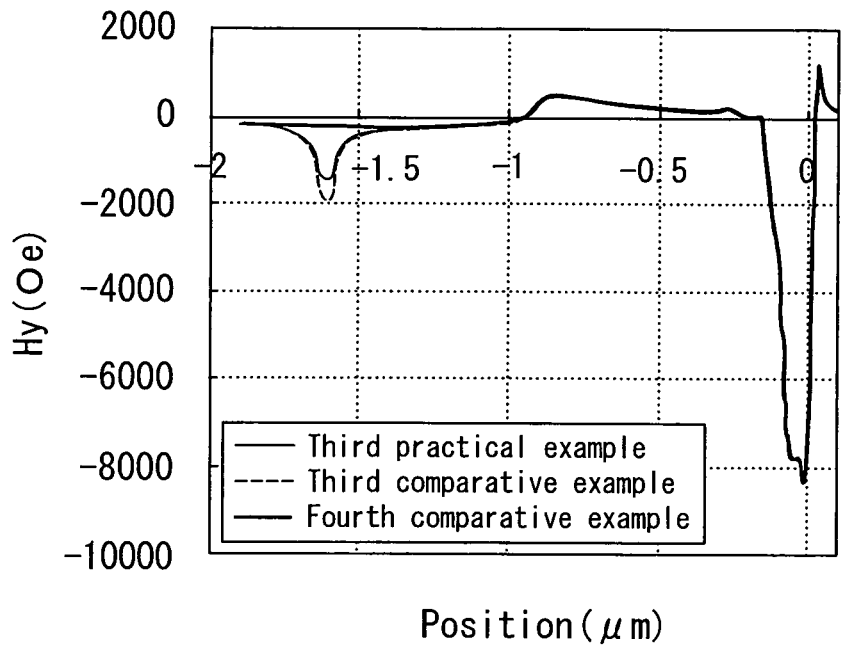
FIG. 14 is a characteristic chart showing the magnitude, determined by simulation, of a component of a magnetic field in a direction perpendicular to the medium facing surface, the magnetic field being generated from the medium facing surface.
Figure 15:
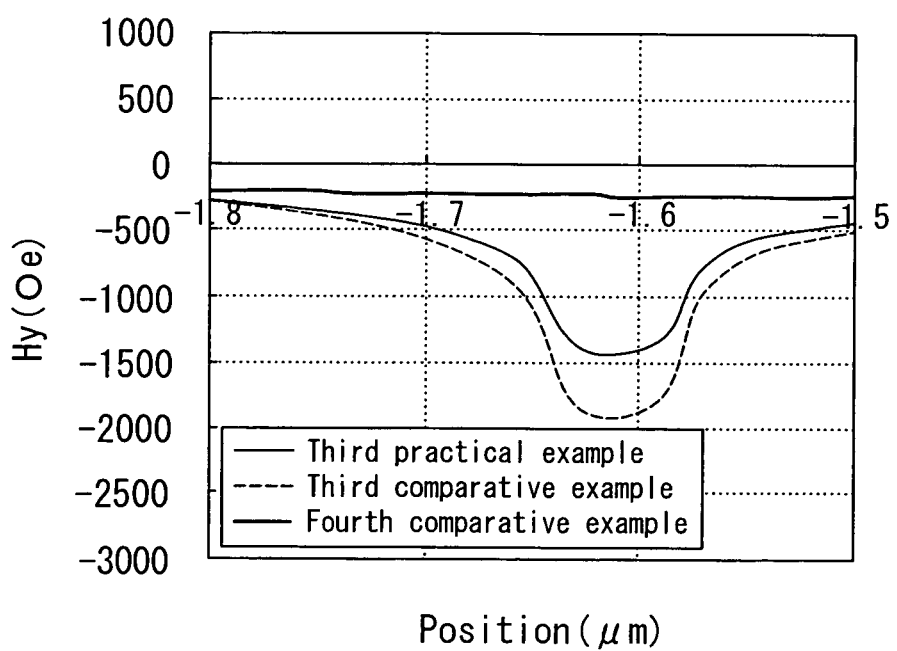
FIG. 15 is an enlarged characteristic chart showing part of FIG. 14.

FIG. 14 is a characteristic chart showing the magnitude Hy of the component of the magnetic field generated from the medium facing surface 70 in the direction perpendicular to the medium facing surface 70 determined by the simulation. FIG. 15 is an enlarged characteristic chart showing part of FIG. 14. In FIG. 14 and FIG. 15, the horizontal axis represents the position along the direction of travel of the recording medium (the Z direction) (in µm), and the vertical axis represents Hy (in Oe). Note that on the horizontal axis of FIG. 14, the 0 µm position is the position of an edge of the end face of the magnetic pole 20 located in the medium facing surface 70, the edge being closer to the second gap layer 26. Furthermore, on the vertical axis of FIG. 14 and FIG. 15, the magnitude of the magnetic field directed toward the recording medium from the medium facing surface 70 is expressed in negative values.

In FIG. 14, the magnitude peak of Hy in the vicinity of the 0 µm position indicates the magnitude of the magnetic field directed toward the recording medium from the end face of the magnetic pole 20. As shown in FIG. 14 and FIG. 15, both the third practical example and the third comparative example show respective small peaks of Hy in the vicinity of the −1.6 µm position. These peaks indicate the magnitudes of the magnetic fields directed toward the recording medium from the end face 60a of the heat sink 60 of the model of the third practical example and from the end face of the heat sink of the model of the third comparative example, respectively. As shown in FIG. 15, the magnitude of the magnetic field directed toward the recording medium from the end face 60a of the heat sink 60 of the model of the third practical example is smaller by about 25% than the magnitude of the magnetic field directed toward the recording medium from the end face of the heat sink of the model of the third comparative example. This shows that when compared with a heat sink that consists only of a ferromagnetic layer, the heat sink 60 of the embodiment is capable of reducing the magnitude of the magnetic field directed toward the recording medium from the end face 60a of the heat sink 60.

According to the embodiment, as described above, it is possible with the heat sink 60 to dissipate heat that the contact sensor 50 generates when energized. This allows the contact sensor 50 to provide improved reliability. Furthermore, according to the embodiment, the heat sink 60 is mainly formed of a metal-based magnetic material the same as the material for the main pole 20 and the write shield 21, which are the principal elements of the write head section 10. This makes it possible that in the medium facing surface 70, the end face 50a of the contact sensor 50 and the end face 60a of the heat sink 60 are prevented from being recessed or protruded. It is thereby possible to prevent the sensitivity of the contact sensor 50 from being degraded or the write characteristics of the write head section 10 and the read characteristics of the read head section 3 from being deteriorated. Furthermore, according to the embodiment, it is possible to reduce the magnitude of the magnetic field directed toward the recording medium 262 from the end face 60a of the heat sink 60 when compared with the case with a heat sink that consists only of a ferromagnetic layer. The embodiment thus makes it possible that the magnetic field directed toward the recording medium 262 from the end face 60a of the heat sink 60 is prevented from adversely affecting the recording medium 262 or the write characteristics of the write head section 10. As can be seen from the discussions above, it is possible according to the embodiment to provide improved reliability of the contact sensor 50 without degrading the sensitivity of the contact sensor 50 and without adversely affecting the recording medium 262 or the write characteristics of the write head section 10.

[Modification Example]

Figure 16:
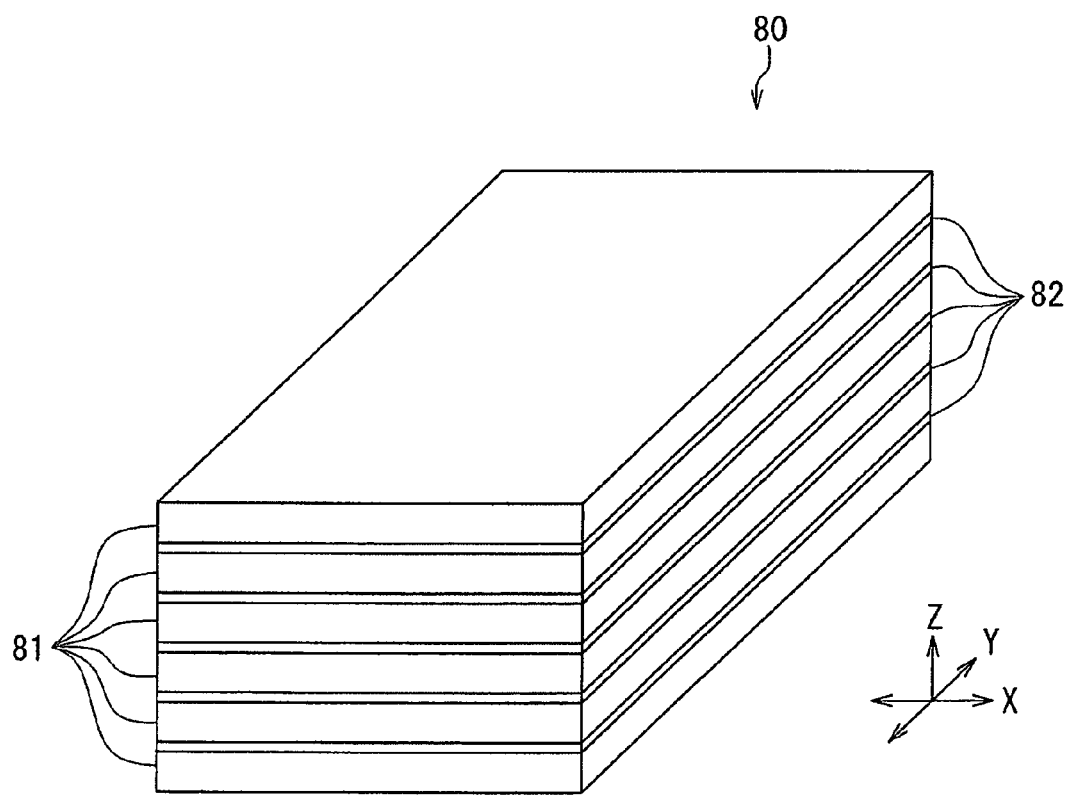
FIG. 16 is a perspective view showing a heat sink of a modification example of the embodiment of the invention.

A modification example of the embodiment will now be described. FIG. 16 is a perspective view showing a heat sink of the modification example of the embodiment. The heat sink 80 of the modification example has a plurality of ferromagnetic layers 81 and a plurality of intermediate layers 82 that are alternately stacked. Two of the plurality of ferromagnetic layers 81 are disposed at opposite ends of the heat sink 80 in the stacking direction. In the example shown in FIG. 16, the number of the ferromagnetic layers 81 is six, and the number of the intermediate layers 82 is five. The material of the ferromagnetic layers 81 is the same as that of the ferromagnetic layer 61 or 63. The material of the intermediate layers 82 is the same as that of the intermediate layer 62.

In the modification example, any two ferromagnetic layers 81 that are vertically adjacent to each other with one of the intermediate layers 82 therebetween are antiferromagnetically exchange-coupled to each other via the intermediate layer 82 by the RKKY interaction. The magnetization directions of such two ferromagnetic layers 81 are antiparallel to each other. Here, the thinner the ferromagnetic layers 81, the greater the magnitude of the exchange coupling field that acts between the two ferromagnetic layers 81 becomes. According to the modification example, the heat sink 80 can be formed with the ferromagnetic layers 81 reduced in thickness to make the exchange coupling field greater. As such, the modification example allows the heat sink 80 to be more resistant to magnetization by the external magnetic field, and consequently allows for further reducing the magnitude of the magnetic field directed toward the recording medium 262 from the end face of the heat sink 80.

The present invention is not limited to the foregoing embodiment, and various modifications may be made thereto. For example, the contact sensor 50 and the heat sink 60 need only be disposed between the MR element 5 of the read head section 3 and the magnetic pole 20 of the write head section 10, and the arrangement of them is not limited to the example shown in FIG. 3.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head comprising:
   a medium facing surface that faces a surface of a recording medium;

a write head section;

a contact sensor that detects contact of the medium facing surface with the surface of the recording medium; and a heat sink adjacent to the contact sensor, wherein:

the write head section has a magnetic pole that produces a write magnetic field for writing data on the recording medium;

the contact sensor and the heat sink have respective end faces located in the medium facing surface;

the contact sensor varies in resistance in response to temperature variations, and is to be energized; and the heat sink includes an intermediate layer made of a nonmagnetic metal material, and two ferromagnetic layers made of a metal-based magnetic material, the two ferromagnetic layers being disposed with the intermediate layer therebetween, and being antiferromagnetically exchange-coupled to each other via the intermediate layer.

2. The magnetic head according to claim 1, further comprising an insulating film interposed between the contact sensor and the heat sink.

3. The magnetic head according to claim 2, wherein the insulating film has a thickness greater than zero and smaller than 370 nm.

4. The magnetic head according to claim 1, further comprising a heater that generates heat for causing part of the medium facing surface to protrude.

5. A head assembly comprising a slider, and a supporter that flexibly supports the slider, wherein the slider includes the magnetic head according to claim 1, and is disposed to face the surface of the recording medium.

6. A magnetic recording device comprising the magnetic head according to claim 1, the recording medium, and a positioning device that supports the magnetic head and positions the magnetic head with respect to the recording medium.

* * * * *